3,539,627
PROCESS FOR PRODUCTION OF UREA
Theodore O. Wentworth, Cincinnati, Ohio, and Paul G. Laux, Carmel, and David G. Edwards, Carmel Valley, Calif., assignors to Vulcan-Cincinnati, Inc., Cincinnati, Ohio, a corporation of Ohio
No Drawing. Filed Jan. 4, 1968, Ser. No. 695,588
Int. Cl. C07c *127/00*
U.S. Cl. 260—555           4 Claims

---

ABSTRACT OF THE DISCLOSURE

A process for the production of urea by reacting carbon dioxide, ammonia and a cyanate salt is shown. Introduction of the cyanate salt to the conventional urea reaction system breaks normal equilibrium and permits total conversion of reactants to take place with less production of by-product water. Costly ammonium carbamate decomposition steps are avoided.

---

This invention relates generally to a process for the production of urea from carbon dioxide and ammonia. More specifically, it relates to a process whereby these raw materials, in admixture with a cyanate salt, are reacted to form urea with increased yield and economy of operation.

The art of urea manufacture is well-developed and replete with patents and literature articles disclosing a wide variety of manufacturing processes. In general, the commercial processes rely upon the known two-step process in which ammonium carbamate is synthesized from carbon dioxide and ammonia and then dehydrated to urea. The reactions are as follows:

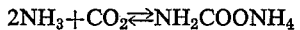

The synthesis and dehydration reactions take place sequentially in the liquid phase and without aid of catalysts at temperatures between 130° and 250° C. and at pressures between 500 and 10,000 p.s.i.a. The equilibrium, and thus the conversion, in both reactions is favored at higher temperatures but the pressure required to maintain the reaction mixture in the liquid phase and avoid decomposition of carbamate is increased accordingly and places an economic upper limit upon reaction temperature. The side reaction of urea with itself to form undesirable biuret is also promoted at higher temperatures and similarly places an upper limit on reaction temperature. In some processes, ammonia is fed to the reaction vessel in quantities substantially in excess of stoichiometric in order to boost conversion in the first of the two above reactions. The cost of ammonia recovery and recycle, however, limit the amount of ammonia which can be recycled economically. At relatively high reaction temperatures and pressures and in the presence of substantial excesses of ammonia, the conversion per pass of ammonium carbamate may be as high as 85%; at more moderate reaction conditions, and with stoichiometric feeds, the conversion per pass of carbamate is from 40% to 50%.

Unconverted ammonium carbamate has no value except for its contained carbon dioxide and ammonia and it must be either recycled or decomposed into its constituents and these recycled to make the overall process economically feasible. For this reason, in essentially all commercial urea processes, the reactor effluent containing unconverted ammonium carbamate, unreacted carbon dioxide and ammonia, urea and by-product water is passed to a carbamate decomposer wherein at substantially reduced pressure, it is heated to decompose the ammonium carbamate to carbon dioxide and ammonia. A liquid phase containing urea and water is separated from the ammonium carbamate decomposition gases and further processed by any of several schemes. The gases are separated from each other, the carbon dioxide being recycled or purged from the system, as economics dictate, and the ammonia being recycled or used for some other industrial purpose.

It is in the carbamate decomposition and gas recovery systems that substantial costs are incurred. Ammonium carbamate is extremely corrosive at the conditions under which it is formed and decomposed and vessels and pipes must be made of or lined with expensive alloys as shown in U.S. Pat. No. 3,236,388. The art has suggested the use of two stages of decomposition to reduce biuret formation and this too adds costs. (See application Ser. No. 347,763, now U.S. Pat. No. 3,471,558.) The gas scrubbing and recompression systems required are particularly elaborate where there is a substantial ammonia recycle or where carbon dioxide is recycled to the reaction system; in this connection, see U.S. Pat. No. 3,107,149, Chemical Engineering, Jan. 26, 1959, pp. 73–81 and Chemical Engineering, Sept. 26, 1966, pp. 96–98.

In light of the foregoing, it is the primary object of this invention to provide a reaction process for the synthesis of urea from carbon dioxide and ammonia which avoids the expense and the difficulty associated with the decomposition and recycle of ammonium carbamate solutions or the separated products therefrom.

It is a further object of this invention to provide an efficient reaction process for the synthesis of urea from carbon dioxide and ammonia which can be carried out without resorting to extremes of temperature, pressure or ammonia recycle.

It is a more specific object of this invention to alter the equilibrium of the reaction equations set forth above to permit them to go to completion thereby dehydrating all ammonium carbamate in the reactor.

It is a related object of this invention to remove the by-product water which is formed to obviate later evaporation steps wherein biuret may be formed.

These and other objects of this invention are achieved by reacting ammonia and carbon dioxide under otherwise conventional conditions in the presence of a cyanate salt. More specifically, it has been discovered that if a mixture of ammonia, carbon dioxide and a cyanate salt in stoichiometric quantities for the production of urea are reacted at temperatures between 270° and 425° F., preferably 375° to 400° F., and at pressures between 500 and 10,000 p.s.i.a., preferably 2,000 to 3,000 p.s.i.a., substantially all carbamate formed is dehydrated to urea and all by-product water formed reacts with the metal ion of the cyanate salt to form a carbonate salt.

The overall reaction scheme, as modified by the addition of cyanate salt (potassium), may be expressed in the following equations:

(1) $\quad 2NH_3 + CO_2 \rightarrow NH_4CO_2NH_2$

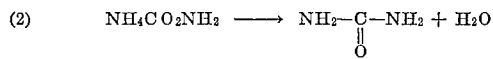
(2) $\quad NH_4CO_2NH_2 \longrightarrow NH_2-\underset{\underset{O}{\|}}{C}-NH_2 + H_2O$ (3) $\quad H_2O + KOCN \rightarrow 1/2 K_2CO_3 + 1/2 NH_3 + 1/2 HNCO$

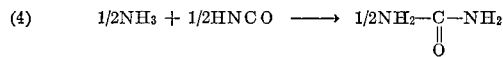
(4) $\quad 1/2 NH_3 + 1/2 HNCO \longrightarrow 1/2 NH_2-\underset{\underset{O}{\|}}{C}-NH_2$ or more simply in the overall equation:

(5)
$2 NH_3 + CO_2 + KOCN \longrightarrow 1\,1/2 NH_2-\underset{\underset{O}{\|}}{C}-NH_2 + 1/2 K_2CO_3$ the addition of potassium cyanate to the conventional reaction mixture removes the water formed in Reaction 2 above and consequently forces that reaction and Reaction 1 to go to completion. The isocyanic acid and ammonia formed in Reaction 3 in turn react and form more urea. The net result is the complete conversion of carbon dioxide and ammonia to urea and removal of by-product water as potassium carbonate and urea. A number of cyanate salts can be used including those of sodium and potassium.

The theoretical equations relating to the invention are worthwhile to consider. They are set forth to further describe the chemical system in which the process acts and are to be construed as limiting the overall process. Isocyanic acid is known to be the dehydration product of carbamic acid:

(6)
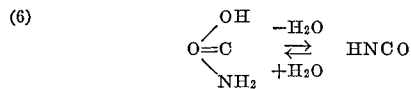

as well, the deammoniation product of urea:

(7)
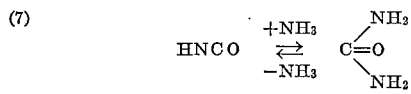

Carbamic acid exists in equilibrium with carbonic acid, urea, ammonia and water as indicated in Reaction 8.

(8)
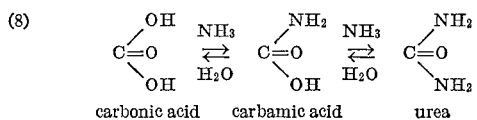
carbonic acid    carbamic acid    urea

Free isocyanic acid decomposes in aqueous solution to carbonic acid and ammonia according to Reaction 9.

(9) $\quad HNCO + 2H_2O \rightarrow H_2CO_3 + NH_3$

The cyanate ion has the structure $O=C=N$ or $$-O-C\equiv N$$

the free acid has the iso configuration $H-N=C=O$. Urea, upon melting or in aqueous solution dissociates to form ammonium and cyanate ions according to Reaction 10.

(10)
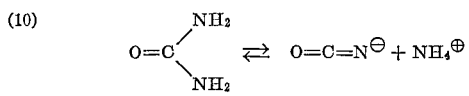

The left hand reaction, i.e., the urea formation reaction has an equilibrium constant of about $10^4$. The mechanism for the formation of urea involves a nucleophilic attack by molecular ammonia on the carbon of isocyanic acid followed by a rapid redistribution of protons:

(11)
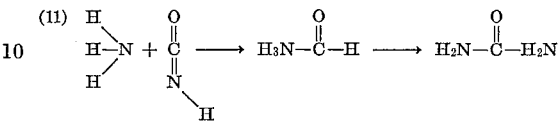

Equations 1–4 can be verified experimentally as shown in the following example.

EXAMPLE I

Ammonium carbamate, potassium cyanate (anhydrous, reagent grade) and ammonia (anhydrous grade) were reacted on a batch basis in a high pressure reaction vessel. The vessel was heated in a drum of heat transfer lubricant maintained at the desired temperature of 385°–390° F. The procedure used was as follows:

A weighed amount of ammonium carbamate was transferred to the reaction vessel. The vessel was sealed and the calculated amount of ammonia was pumped in via a calibrated pump. The vessel was placed in the heating bath, which was slightly above the desired temperature, and brought to reaction temperature. After attaining desired temperature, the vessel was maintained at that temperature for forty minutes. The reaction vessel was rapidly cooled to reduce pressure. After cooling, the gases remaining were absorbed in methanol and analyzed for carbon dioxide, ammonia, and water. The vessel was then opened and the contents dissolved first in methanol; insoluble material was filtered and dissolved in water. The methanol fraction was analyzed for urea, ammonia, carbon dioxide and water. The water fraction was treated in a similar manner except that no analysis was made for water. Analysis was also made in some instances for cyanate and/or other materials. Analyses were performed according to standard analytical procedures in accordance with those recommended by the Association of Official Agricultural Chemists. Urea was determined by urease analysis. The data obtained from a series of batch experiments carried out by the foregoing procedure are presented in Table I.

In Table I, the values "ammonium carbamate taken" represent the amounts of ammonium carbamate reacted; similarly the values "potassium cyanate taken" represent the amount of potassium cyanate reacted; and the values "ammonia added" and "urea found" are self-explanatory. The value "carbon dioxide available" is determined as follows. The stoichiometry of Equations 1–4 indicate that each mole of carbamate contains an equivalent mole of carbon dioxide for urea production and each mole of potassium cyanate contains one-half mole of carbon dioxide for urea production. The theoretical carbon dioxide available is therefore equal to the sum of ammonium carbamate taken and one-half of potassium cyanate taken. In the batch operations, however, some carbon dioxide is in the vapor phase above the reacting liquids and is unavailable for reaction. This quantity is determined experimentally and subtracted from the theoretical carbon dioxide available to set the value "carbon dioxide available." The value "conversion $CO_2$ to urea" is then the fraction urea found/carbon dioxide available.

Ammonium carbamate is used in these tests instead of ammonia and carbon dioxide separately. This is solely for convenience; the carbamate may be considered as containing its equivalent of carbon dioxide and ammonia.

TABLE 1—POTASSIUM CYANATE ADDITION

| Test No. | Ammonium carbamate taken/moles | Potassium cyanate taken/moles | Ammonia added, moles | Carbon dioxide avail./moles | Urea found, moles | Conversion $CO_2$ to urea in percent | Pressure, p.s.i.a. |
|---|---|---|---|---|---|---|---|
| 1 | 0.128 | 0.160 | 0.0 | 0.153 | 0.140 | 91.50 | 500 |
| 2 | 0.206 | 0.300 | 0.0 | 0.300 | 0.235 | 78.33 | 500 |
| 3 | 0.206 | 0.300 | 0.0 | 0.300 | 0.285 | 95.00 | 500 |
| 4 | 0.229 | 0.330 | 0.0 | 0.294 | 0.230 | 78.23 | 500 |
| 5 | 0.206 | 0.330 | 0.0 | 0.271 | 0.235 | 86.71 | 600 |
| 6 | 0.128 | 0.192 | 0.8 | 0.174 | 0.175 | 100.58 | 800 |
| 7 | 0.128 | 0.160 | 1.0 | 0.158 | 0.145 | 91.77 | 1,000 |
| 8 | 0.410 | 0.330 | 0.0 | 0.375 | 0.340 | 90.67 | 1,000 |
| 9 | 0.200 | 0.300 | 0.5 | 0.250 | 0.250 | 100.00 | 1,800 |
| 10 | 0.474 | 0.232 | 0.0 | 0.288 | 0.273 | 94.79 | 1,800 |
| 11 | 1.551 | 1.296 | 2.1 | 1.057 | 1.057 | 100.00 | 2,000 |
| 12 | 0.128 | 0.160 | 1.0 | 0.158 | 0.144 | 91.13 | 2,300 |
| 13 | 0.474 | 0.232 | 0.8 | 0.444 | 0.408 | 91.89 | 2,300 |
| 14 | 0.356 | 0.296 | 0.8 | 0.355 | 0.341 | 96.05 | 2,400 |
| 15 | 0.128 | 0.160 | 1.0 | 0.158 | 0.145 | 91.77 | 2,500 |
| 16 | 0.128 | 0.160 | 1.0 | 0.158 | 0.140 | 88.61 | 2,500 |
| 17 | 0.128 | 0.110 | 1.0 | 0.133 | 0.118 | 88.72 | 2,500 |
| 18 | 0.200 | 0.300 | 1.2 | 0.250 | 0.258 | 103.20 | 2,500 |
| 19 | 0.254 | 0.254 | 1.5+ | ---------- | 0.303 | ---------- | 4,600 |
| 20 | 0.256 | 0.160 | 1.5+ | 0.188 | 0.186 | 98.93 | 4,600 |
| 21 | 0.128 | 0.192 | 1.5+ | ---------- | 0.151 | ---------- | 5,600 |

NOTE.—In each test, the amount of residual water in the final system was approximately 10% of that formed in Equation 2.

The data in Table I demonstrate that Reactions 1–4 properly describe the system; cyanate reacts with the water formed in the dehydration of ammonium carbamate, breaking the equilibrium and converting essentially all of the available carbon dioxide to urea. It is not necessary to employ the high reaction pressures used in the conventional synthesis process in order to force the equilibrium and, in fact, the conversion of carbon dioxide to urea is independent of the system pressure. It is also evident that an excess of ammonia in the system does not increase the conversion of carbon dioxide to urea. Thus, by the method of this invention, an essentially complete conversion of carbon dioxide can be obtained without resorting to excessive temperatures, pressures and ammonia recycle rates, the expenses and difficulties inherent in the carbamate or decomposition recycle process are avoided and by-product water is removed from the product. The by-product potassium carbonate may be left in the urea product since it is a component of fertilizer compositions.

What is claimed is:

1. A process for the production of urea comprising the steps of: (1) forming a mixture of carbon dioxide, ammonia and a cyanate salt selected from the group consisting of potassium cyanate and sodium cyanate in at least stoichiometric quantities for the production of urea; and (2) reacting said mixture at a temperature between 270° and 425° F. and at a pressure between 500 and 10,000 p.s.i.a. to form urea.

2. The process of claim 1 wherein the cyanate salt is potassium cyanate.

3. The process of claim 1 wherein the cyanate salt is sodium cyanate.

4. A process for the production of urea comprising the steps of: (1) forming a mixture of ammonium carbamate and a cyanate salt selected from the group consisting of potassium cyanate and sodium cyanate in at least stoichiometric quantities for the production of urea; (2) reacting said mixture at a temperature between 270° and 425° F. and at a pressure between 500 and 10,000 p.s.i.a. to form urea.

References Cited

UNITED STATES PATENTS 2,694,728  11/1954  Lento et al. _____ 260—555

BERNARD HELFIN, Primary Examiner

M. W. GLYNN, Assistant Examiner

UNITED STATES PATENT OFFICE
CERTIFICATE OF CORRECTION

Patent No. 3,539,627                Dated November 10, 1970

Inventor(s) Theodore O. Wentworth, Paul G. Laux, David G. Edw

It is certified that error appears in the above-identified patent and that said Letters Patent are hereby corrected as shown below:

Column 3, line 34, immediately after "are" insert --not--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents

FORM PO-1050 (10-69)